United States Patent
Park

(10) Patent No.: US 11,520,628 B2
(45) Date of Patent: Dec. 6, 2022

(54) COOPERATIVE DYNAMIC CLOCK AND VOLTAGE SCALING (DCVS) BETWEEN TWO PROCESSOR SYSTEMS

(71) Applicant: QUALCOMM INCORPORATED, San Diego, CA (US)

(72) Inventor: Hee Jun Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 16/878,974

(22) Filed: May 20, 2020

(65) Prior Publication Data

US 2021/0365288 A1 Nov. 25, 2021

(51) Int. Cl.
| | |
|---|---|
| *G06F 9/48* | (2006.01) |
| *G06F 9/50* | (2006.01) |
| *G06F 1/04* | (2006.01) |
| *G06F 1/06* | (2006.01) |
| *G06F 1/08* | (2006.01) |
| *G06F 11/30* | (2006.01) |

(52) U.S. Cl.
CPC ............. *G06F 9/4893* (2013.01); *G06F 1/04* (2013.01); *G06F 1/06* (2013.01); *G06F 1/08* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5083* (2013.01); *G06F 9/5094* (2013.01); *G06F 11/30* (2013.01)

(58) Field of Classification Search
CPC ........ G06F 9/48; G06F 9/4806; G06F 9/4843; G06F 9/4881; G06F 9/4893; G06F 9/50; G06F 9/5005; G06F 9/5083; G06F 9/5094; G06F 1/04; G06F 1/06; G06F 1/08; G06F 11/30
See application file for complete search history.

(56) References Cited

U.S. PATENT DOCUMENTS

| | | | | |
|---|---|---|---|---|
| 2006/0248360 | A1* | 11/2006 | Fung | G06F 1/3296 713/300 |
| 2007/0156370 | A1* | 7/2007 | White | G06F 1/324 702/132 |

(Continued)

OTHER PUBLICATIONS

Zhao et al., "Thermal-aware Voltage Droop Compensation for Multi-Core Architectures", GLSVLSI'10, May 16-18, 2010, ACM, pp. 335-340 (Year: 2010).*

(Continued)

*Primary Examiner* — Charles M Swift
(74) *Attorney, Agent, or Firm* — Smith Tempel Blaha LLC/Qualcomm

(57) ABSTRACT

In a real-time system having first and second processor systems, cooperative dynamic clock and voltage scaling ("DCVS") may include a first processor system monitoring a condition indicative of first processor workload, adjusting a first processor operating frequency in response to a detected amount of change in the first processor workload, and providing an indication based on the detected amount of change in the first processor workload to the second processor contemporaneously with providing first processor output data to the second processor. The cooperative DCVS may further include the second processor system adjusting a second processor operating frequency in response to the indication.

30 Claims, 12 Drawing Sheets

(56) References Cited

U.S. PATENT DOCUMENTS

| | | | |
|---|---|---|---|
| 2009/0041159 A1* | 2/2009 | Duvvuru | H04W 52/028 375/316 |
| 2013/0159741 A1* | 6/2013 | Schluessler | G06F 1/329 713/320 |
| 2015/0095620 A1* | 4/2015 | Ananthakrishnan | G06F 9/30083 712/220 |
| 2015/0134995 A1* | 5/2015 | Park | G06F 1/206 713/340 |
| 2015/0309952 A1* | 10/2015 | Breakstone | B01D 29/39 710/313 |
| 2016/0170469 A1* | 6/2016 | Sehgal | G06F 1/3206 713/320 |
| 2018/0129243 A1* | 5/2018 | Park | G06F 11/3024 |
| 2019/0369706 A1* | 12/2019 | Dokku | G06F 13/1668 |
| 2020/0059813 A1 | 2/2020 | Park et al. | |
| 2020/0125148 A1 | 4/2020 | Lee et al. | |
| 2021/0295705 A1* | 9/2021 | Yang | G08G 1/091 |

OTHER PUBLICATIONS

International Search Report and Written Opinion—PCT/US2021/027307—ISA/EPO—dated Jul. 23, 2021.

* cited by examiner

COOPERATIVE DYNAMIC CLOCK AND VOLTAGE SCALING (DCVS) BETWEEN TWO PROCESSOR SYSTEMS

DESCRIPTION OF THE RELATED ART

Mobile or portable computing devices ("PCD"s) are becoming necessities for people on personal and professional levels. These devices may include cellular telephones, tablet computers, palmtop computers, portable digital assistants ("PDA"s), portable game consoles, and other portable electronic devices. PCDs commonly contain integrated circuits or systems-on-a-chip ("SoC"s) that include numerous components designed to work together to deliver functionality to a user. For example, an SoC may contain any number of processing engines, such as modems, central processing units ("CPU"s) with multiple cores, graphical processing units ("GPU"s), etc.

As a PCD is powered by a battery, power management is a major consideration. Effective PCD power management helps provide a long battery life and a comfortable skin temperature and also reduces the likelihood of excessive heat impairing the operation of processing components. Dynamic clock and voltage scaling ("DCVS") is a technique by which the frequency and voltage at which a processor is operated are adjusted dynamically, i.e., in real time in response to changes in operating conditions, to deliver a desired balance or tradeoff between power consumption and performance level. When lower power consumption is of higher priority than higher performance, the clock frequency and voltage may be decreased, and when higher performance is of higher priority than lower power consumption, the clock frequency and voltage may be increased.

The term "Internet of Things" or "IOT" refers to the interconnection of devices, machines, sensors, vehicles, and other things over data networks, including mobile broadband networks. The term "vehicle-to-everything" or "V2X" refers to communication between vehicles, between vehicles and mobile networks, or between vehicles and anything else.

In some circumstances, such as in certain types of mobile computing devices, performance remains paramount at essentially all times. In a V2X system, for example, it may be desirable to maintain a processing time or latency below a threshold to avoid increasing the likelihood of compromising vehicle safety. For this reason, DCVS may be avoided in such circumstances, even though minimizing power consumption and heat generation may be desirable.

SUMMARY OF THE DISCLOSURE

Systems and methods are disclosed for cooperative DCVS between two processor systems.

An exemplary method for cooperative DCVS between a first and a second processor system may include monitoring, by the first processor system, a condition indicative of first processor workload. The method may also include adjusting, by the first processor system, a first processor operating frequency in response to a detected amount of change in the first processor workload. The method may further include providing, by the first processor system, first processor output data to the second processor system over a communication link between the first processor system and the second processor system. The method may still further include providing, by the first processor system, an indication based on the detected amount of change in the first processor workload to the second processor system contemporaneously with providing the first processor output data. The method may yet further include adjusting, by the second processor system, a second processor operating frequency in response to the indication.

An exemplary system for cooperative RCVS may include may include a first processor system and a second processor system. The first processor system may be configured to monitor a condition indicative of a first processor workload and to adjust a first processor operating frequency in response to a detected amount of change in the first processor workload. The second processor system may be configured to receive first processor output data from the first processor system over a communication link between the first processor system and the second processor system. The first processor system may be further configured to provide to the second processor system an indication based on the detected amount of change in the first processor workload contemporaneously with providing the first processor output data to the second processor system. The second processor system may be further configured to adjust a second processor operating frequency in response to the indication.

Another exemplary system for cooperative DCVS between a first and a second processor system may include means for monitoring a condition indicative of first processor workload. The system may also include means for adjusting a first processor operating frequency in response to a detected amount of change in the first processor workload. The system may further include means for providing first processor output data to the second processor system over a communication link between the first processor system and the second processor system. The system may still further include means for providing an indication based on the detected amount of change in the first processor workload to the second processor contemporaneously with providing the first processor output data. The system may yet further include means for adjusting a second processor operating frequency in response to the indication.

Still another exemplary system for cooperative DCVS may include a first chip and a second chip. The first chip may include a modem processor system core, a data traffic monitor, and a modem processor system operating frequency controller. The modem processor system core may be configured to receive and process incoming wireless communication traffic. The data traffic monitor may be configured to monitor the incoming wireless communication traffic and to detect an amount of change in the incoming wireless communication traffic. The modem processor system operating frequency controller may be configured to adjust the modem processor system core operating frequency in response to detected amount of change in the incoming wireless communication traffic. The second chip may include an application processor system core and an application processor system operating frequency controller. The application processor system core may be configured to receive modem processor output data from the modem processor system core over an inter-chip link between the first chip and the second chip. The first chip may further include control logic configured to provide to the second processor system an indication based on the detected amount of change in the incoming wireless communication traffic. The application processor system operating frequency controller may be configured to adjust an application processor system core operating frequency in response to the indication.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
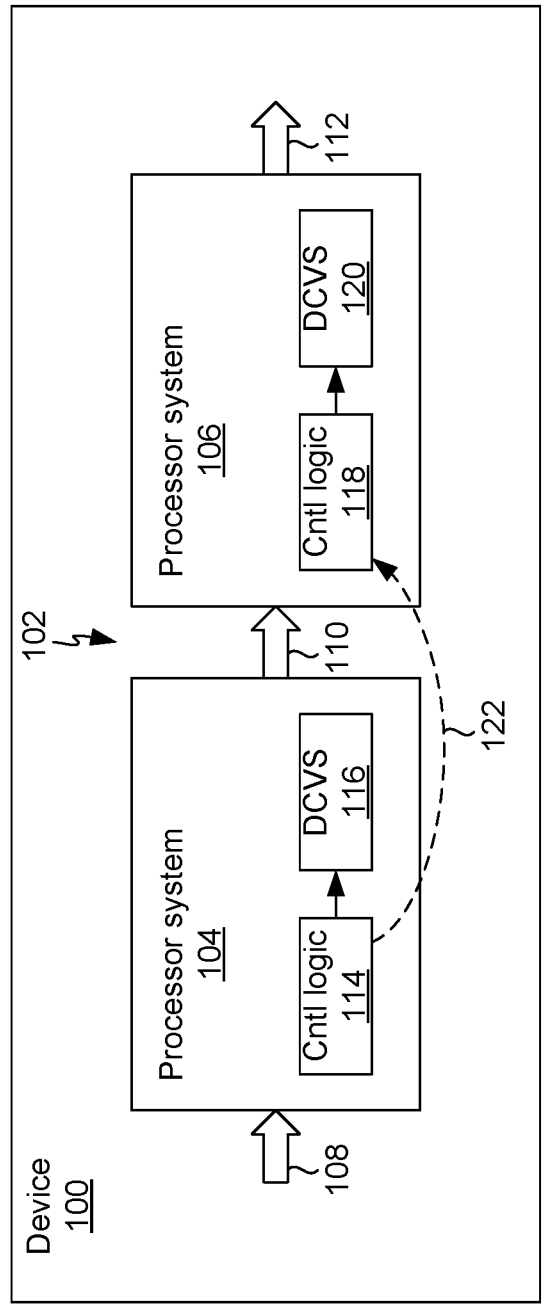
FIG. 1 is a block diagram of a system for cooperative DCVS between a first processor system and a second processor system, in accordance with exemplary embodiments.

As illustrated in FIG. 1, in an illustrative or exemplary embodiment, a device 100 may include a system 102 comprising a first processor system 104 and a second processor system 106. The first processor system 104 may be configured to receive input data 108 and process the input data 108 to produce first processor output data 110. The second processor system 106 may be configured to receive the first processor output data 110 and process the first processor output data 110 to produce system output data 112.

The first processor system 104 includes control logic 114 and dynamic clock and voltage scaling ("DCVS") circuitry 116. The term "DCVS" is used in this disclosure to broadly refer to circuitry that adjusts a clock frequency, a supply voltage level, or a combination of both, in response to detected changes in conditions during operation of the device 100. The control logic 114 is configured to monitor a condition that may be indicative of the workload being experienced by the first processor system 104. As described below, such a condition may be, for example, incoming data traffic to the first processor system 104, a temperature experienced by the first processor system 104, or other condition.

The control logic 114 is configured to detect a change in the monitored condition. In response to detecting a change in the monitored condition, the first processor system 104 may provide an indication to the DCVS circuitry 116. In response to such an indication, the DCVS circuitry 116 may adjust an operating (clock) frequency of the first processor system 104. The amount of adjustment may be proportional or otherwise related to the detected amount of change in the monitored condition and thus in the first processor workload. For example, the DCVS circuitry 116 may be configured to increase the clock frequency of the first processor system 104 in response to a detected increase in the first processor workload and decrease the clock frequency of the first processor system 104 in response to a detected decrease in the first processor workload.

The second processor system 104 similarly includes control logic 118 and DCVS circuitry 120. As conceptually represented by the broken-line arrow 122, the control logic 114 of the first processor system 104 is also configured to provide an indication to the control logic 118 in the second processor system 106. In response to such an indication, the DCVS circuitry 120 may adjust an operating (clock) frequency of the second processor system 106.

Figure 2:
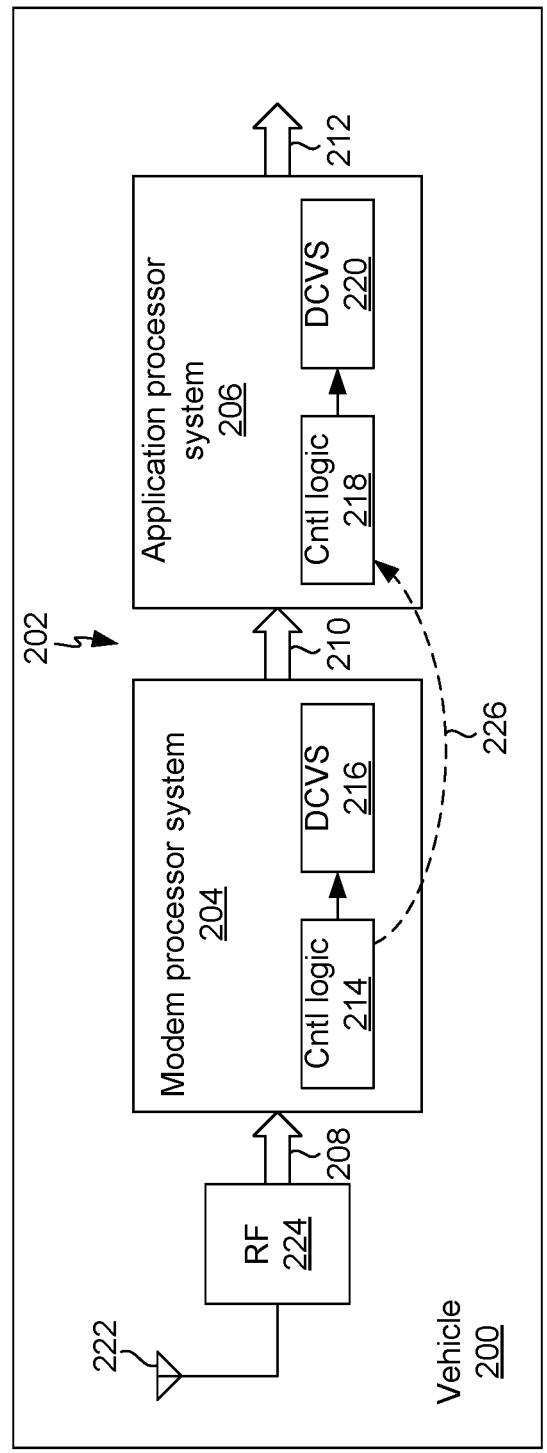
FIG. 2 is a block diagram of a system for cooperative DCVS between a modem processor system and an application processor system in a vehicle, in accordance with exemplary embodiments.

As illustrated in FIG. 2, in an illustrative or exemplary embodiment, a vehicle 200 may include a system 202 comprising a modem processor system 204 and an application processor system 206. The term "application processor" refers to a processor that performs primary processing for the overall system, in contrast with a more specialized processor such as the modem processor system 204. The vehicle 200, modem processor system 204, and the application processor system 206 may be examples of the above-described device 100, first processor system 104, and second processor system 106 (FIG. 1), respectively. Accordingly, the modem processor system 204 is configured to receive input data 208 and process the input data 208 to produce modem processor output data 210. The application processor system 206 is configured to receive the modem processor output data 210 and process the modem processor output data 210 to produce system output data 212. The modem processor system 204 includes control logic 214 and DCVS circuitry 216, which may be configured as described above with regard to above-described control logic 214 and DCVS circuitry 216 (FIG. 1), respectively. Similarly, the application processor system 206 includes control logic 218 and DCVS circuitry 220, which may be configured as described above with regard to above-described control logic 218 and DCVS circuitry 220 (FIG. 1), respectively.

The vehicle 200 may include other elements that are characteristic of mobile devices, such as an antenna system 222 and a radio frequency ("RF") front end 224. The RF front end 224 may receive RF communications from the antenna system 222 and provide received information in the form of the input data 208 to the first processor system 104.

The input data 208 may have any format, such as, for example, data packets organized in accordance with standards such as Long-Term Evolution or "LIE" (also referred to as "4G"), or 5G, or other standards. As understood by one of ordinary skill in the art, in the context of 4G, 5G, etc., the data packets may be organized in subframes. The system 202 may be configured to, among other features, decode received subframes. The modem processor system 204 may be configured to decode lower layers of the communication protocol stack, such as the physical, data link, network, and transport layers, while the application processor system 206 may be configured to, among other features, decode higher layers of the communication protocol stack, such as the session layer, the presentation layer, the application layer, etc.

The vehicle 200 may be autonomous or semi-autonomous, and the system 202 may be involved in processing data used to operate the vehicle. The vehicle 200 may be configured to communicate data (which may be referred to as V2X data or V2X messages) communicated with other vehicles or wireless network infrastructure (not shown). Safe operation of the vehicle 200 may depend upon timely completion of processing (e.g., decoding) V2X data received from such sources. For example, it may be determined that the system 202 is required to complete processing of a certain portion of the input data 208, such as a subframe, within a threshold amount of time, i.e., a window between the time the modem processor system 204 receives that portion of the input data 208 and the time the application processor system 206 provides the corresponding system output data 212.

As conceptually represented by the broken-line arrow 226, the control logic 214 of the modem processor system 204 is also configured to provide an indication to the control logic 218 in the application processor system 206. In response to such an indication, the DCVS circuitry 220 may adjust an operating (clock) frequency of the application processor system 206. For example, the DCVS circuitry 220 may increase the operating frequency of the application processor system 206 to attempt to compensate for a detected increase in the workload being experienced by the modem processor system 204.

Figure 3:
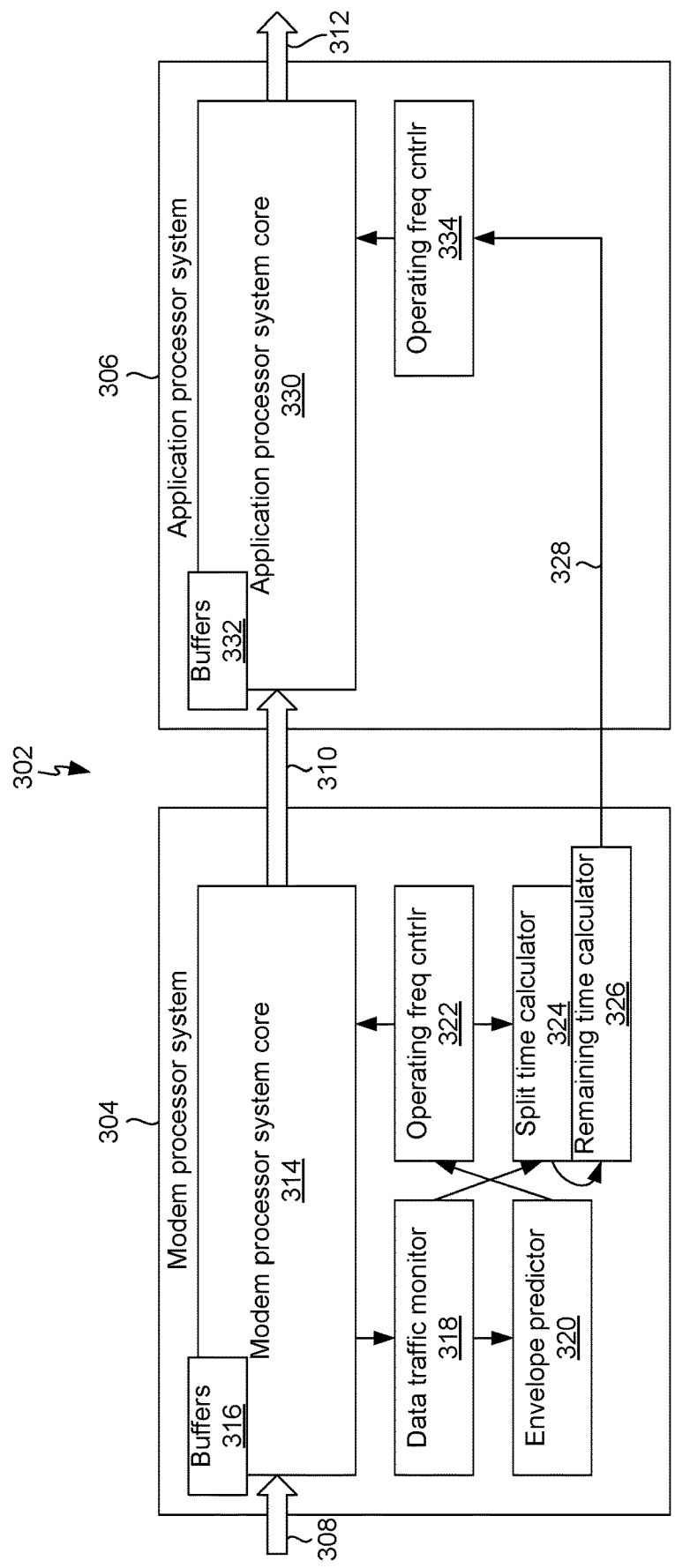
FIG. 3 is block diagram of another system for cooperative DCVS between a first processor system and a second processor system, in accordance with exemplary embodiments.

As illustrated in FIG. 3, in an illustrative or exemplary embodiment, a system 302 may include a modem processor system 304 and an application processor system 306. The modem processor system 304 and the application processor system 306 may be separate chips coupled by one or more data communication links. The modem processor system 304 is configured to receive input data 308 and process the input data 308 to produce modem processor output data 310. The application processor system 306 is configured to receive the modem processor output data 310 and process the modem processor output data 310 to produce system output data 312. The system 302 may be included in a vehicle or other device (not shown) and may be an example of the above-described system 202 (FIG. 2) or 102 (FIG. 1).

As described below in further detail, the system 302 may be configured to process or transform a portion of the input data 308 into a corresponding portion of the output data 312 within a predetermined end-to-end or total processing time budget. The system 302 may be configured to adjust the frequencies at which the modem processor system 304 and the application processor system 306 operate to, in effect, apportion the total processing time budget between them. For example, if it is determined that the modem processor system 204 is experiencing a high workload (e.g., incoming data traffic exceeds a threshold value), the frequency at which the application processor system 306 operates may be increased, thereby allotting more of the total processing time budget to the modem processor system 304. Or if it is determined that the modem processor system 204 is experiencing a low workload, the frequency (and voltage) at which the application processor system 306 operates may be decreased, thereby potentially saving power.

The modem processor system 304 may include a modem processor core 314. Although not separately shown for purposes of clarity, the modem processor core 314 may include elements such as modulation-demodulation circuitry, one or more digital signal processors ("DSP"s), memory, etc., which together may be configured to decode lower layers of the communication protocol stack, such as the physical, data link, network, and transport layers. One or more data buffers 316 may be included in, or otherwise associated with, the modem processor core 314 to buffer the incoming data 308 before processing. (In FIGS. 3-5, blocks that may be included in or otherwise associated with other blocks are conceptually depicted as overlapping.) The incoming data 308 may be organized in subframes, each comprising zero or more messages (also referred to as transport blocks). The incoming data 308 may comprise a stream of successive subframes, and the data buffers 316 may be configured to store each successive subframe's messages for processing by the modem processor core 314.

The modem processor system 304 may include a traffic monitor 318. The traffic monitor 318 may be configured to monitor incoming data traffic to the modem processor system 304. More specifically, in this exemplary embodiment the traffic monitor 318 may count the number of transport blocks in a subframe that has been received (e.g., a subframe stored in the data buffers 316). The number of transport blocks in a subframe may be related to the workload that the modem processor core 314 experiences. That is, the greater the number of transport blocks that the modem processor core 314 needs to process to complete processing f a subframe, the greater the modem processor workload.

The modern processor system 304 may include an envelope predictor 320. The envelope predictor 320 may be configured to provide an indication of predicted modem processor workload that is based on the transport block count in two or more of the most recently received subframes. For example, the envelope predictor 320 may determine a maximum number of transport blocks in the most recently received N subframes. Alternatively, for example, the envelope predictor 320 may determine a moving average of the number of transport blocks in the most recently received N subframes. Still other ways in which the indication of modem processor workload may be determined based on some number of recently received transport blocks or messages may occur to one of ordinary skill in the art in view of these examples. It should be understood that the envelope predictor 320 is configured to predict or estimate the workload that the modem processor core 314 is likely to experience when it later processes the next or an otherwise future subframe after completion of processing of the most recently received subframe.

The modem processor system 304 may include an operating frequency controller 322. The operating frequency controller 322 may be configured to adjust the operating frequency of the modem processor core 314 based on the above-described indication of modem processor workload received from the envelope predictor 320. For example, in response to an indication that the modem processor workload is increasing, the operating frequency controller 322 may increase the frequency of a clock signal applied to the modem processor core 314. Likewise, in response to an indication that the modem processor workload is decreasing, the operating frequency controller 322 may decrease the frequency of the clock signal applied to the modem processor core 314. The operating frequency controller 322 may compare the workload indication with one or more thresholds to determine whether to increase or decrease the operating frequency.

The modem processor system 304 may include a timing controller comprising, for example, a split time calculator 324 and a remaining time calculator 326. The split time calculator may be configured to determine a time ("T") at which the modem processor core 314 has completed processing a transport block (message). The remaining time calculator 326 may be configured to determine the difference between a total processing time budget and the determined time T. The total processing time budget may be referred to as predetermined, fixed, constant, etc., because it is a number that does not change from one transport block to the next, from one subframe to the next, etc. The determined difference represents the amount of time that may be allotted to the application processor system 306 to complete the total or end-to-end processing of the subframe. An indication 328 representing the determined difference or remaining processing time may be sent to the application processor system 306.

The application processor system 306 may include an application processor system core 330. Although not separately shown for purposes of clarity, the application processor system core 330 may include elements such as one or more CPU cores, one or more DSPs, memory, etc., which together may be configured to decode higher layers of the communication protocol stack, such as the session, presentation, and application layers. One or more data buffers 332 may be included in, or otherwise associated with, the application processor system core 330 to buffer the modem processor output data 310 before processing. The modem processor output data 310 may be organized in packets. The modem processor output data 310 may comprise a stream of successive packets, and the data buffers 332 may be configured to store the packets for processing by the application processor system core 330. The modem processor output data 310 may be transmitted from the modem processor system 304 to the application processor system 306 via an inter-chip link, such as universal serial bus ("USB"), peripheral component interconnect express ("PCIe"), etc. In the embodiment illustrated in FIG. 3, the indication 328 may be transmitted to the application processor system 306 via the same or similar link or a separate interconnection.

The application processor system 306 may include an operating frequency controller 334. The operating frequency controller 334 may be configured to adjust the operating frequency of the application processor system core 330 based on the indication 328 received from the modem processor system 304. For example, in response to an indication that only a small portion of the total processing time budget remains to complete decoding of the subframe, the operating frequency controller 334 may increase the frequency of a clock signal applied to the application processor system core 330. Likewise, in response to an indication that a large portion of the total processing time budget remains to complete decoding of the subframe, the operating frequency controller 334 may decrease the frequency of a clock signal applied to the application processor system core 330. The operating frequency controller 334 may compare the indication of the remaining time with one or more thresholds to determine whether to increase or decrease the operating frequency.

Figure 4:
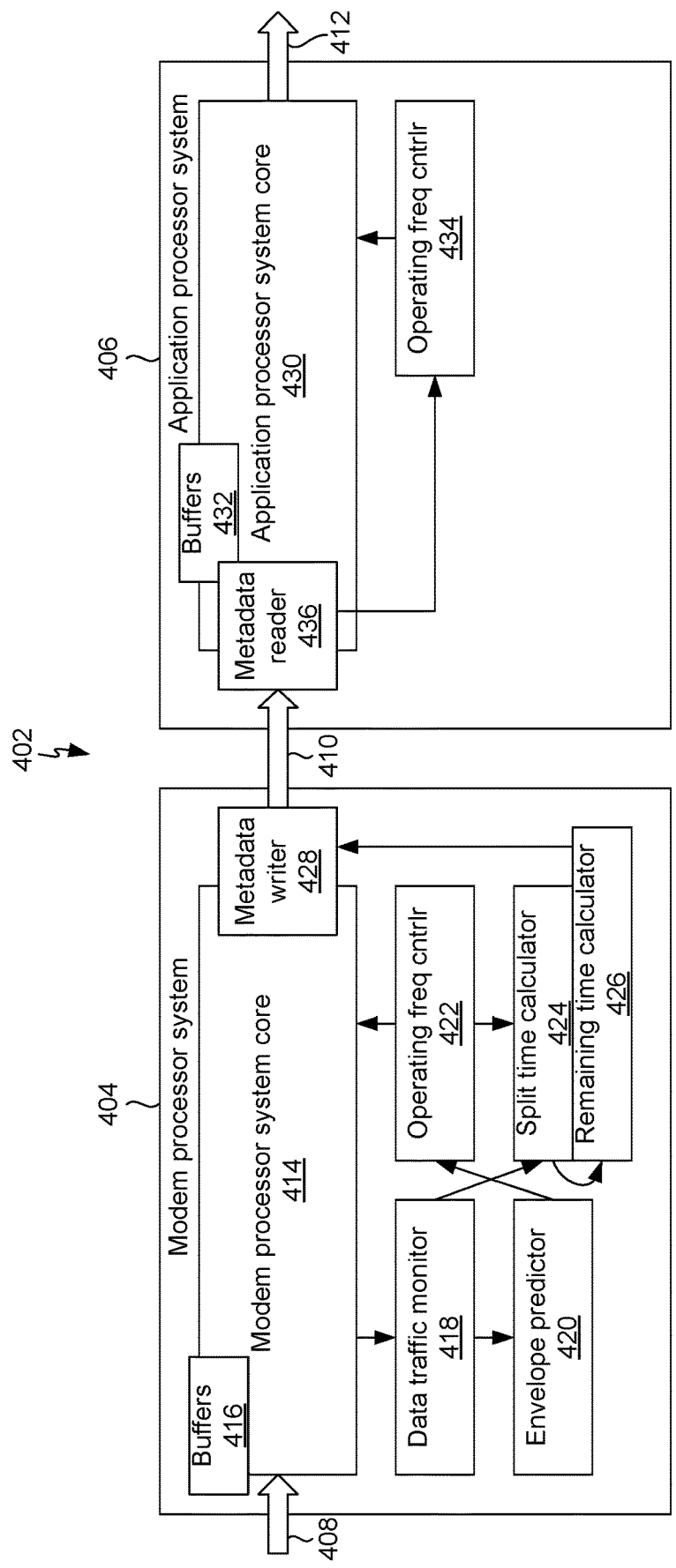
FIG. 4 is block diagram of a further system for cooperative DCVS between a first processor system and a second processor system, in accordance with exemplary embodiments.

As illustrated in FIG. 4, in an illustrative or exemplary embodiment, a system 402 may include a modem processor system 404 and an application processor system 406. The modem processor system 404 is configured to receive input data 408 and process the input data 408 to produce modem processor output data 410. The application processor system 406 is configured to receive the modem processor output data 410 and process the modem processor output data 410 to produce system output data 412. Except as otherwise stated, the elements of the modem processor system 404 and the application processor system 406 may be the same as those of above-described modem processor system 304 and application processor system 306 (FIG. 3). Accordingly, the modem processor system core 414, data buffers 416, data traffic monitor 418, envelope predictor 420, operating frequency controller 422, split time calculator 424, and remaining time calculator 426 may be identical to the above-described modem processor system core 314, data buffers 316, data traffic monitor 318, envelope predictor 320, operating frequency controller 322, split time calculator 324, and remaining time calculator 326 (FIG. 3). Similarly, the application processor system core 430, buffers 432, and operating frequency controller 434 may be identical to the above-described application processor system core 330, buffers 332, and operating frequency controller 334 (FIG. 3).

In the exemplary embodiment shown in FIG. 4, the modem processor system 404 may include a metadata writer 428. The metadata writer 428 may be configured to insert metadata representing the calculated remaining time produced by the remaining time calculator 426 into the modem processor output data 410. Thus, in this embodiment there need not be a separate path through which the indication of the remaining time is sent to the application processor system 406.

The application processor system 406 may include a metadata reader 436. The metadata reader 436 may be configured to read the metadata in the modem processor output data 410 and provide the metadata (i.e., an indication of the portion of the total processing time budget remaining for the application processor system 406 to complete decoding of the subframe) to the operating frequency controller 434. In the manner described above with regard to the operating frequency controller 334 (FIG. 3), the operating frequency controller 434 may adjust the operating frequency of the application processor system core 430 based on that indication.

Figure 5:
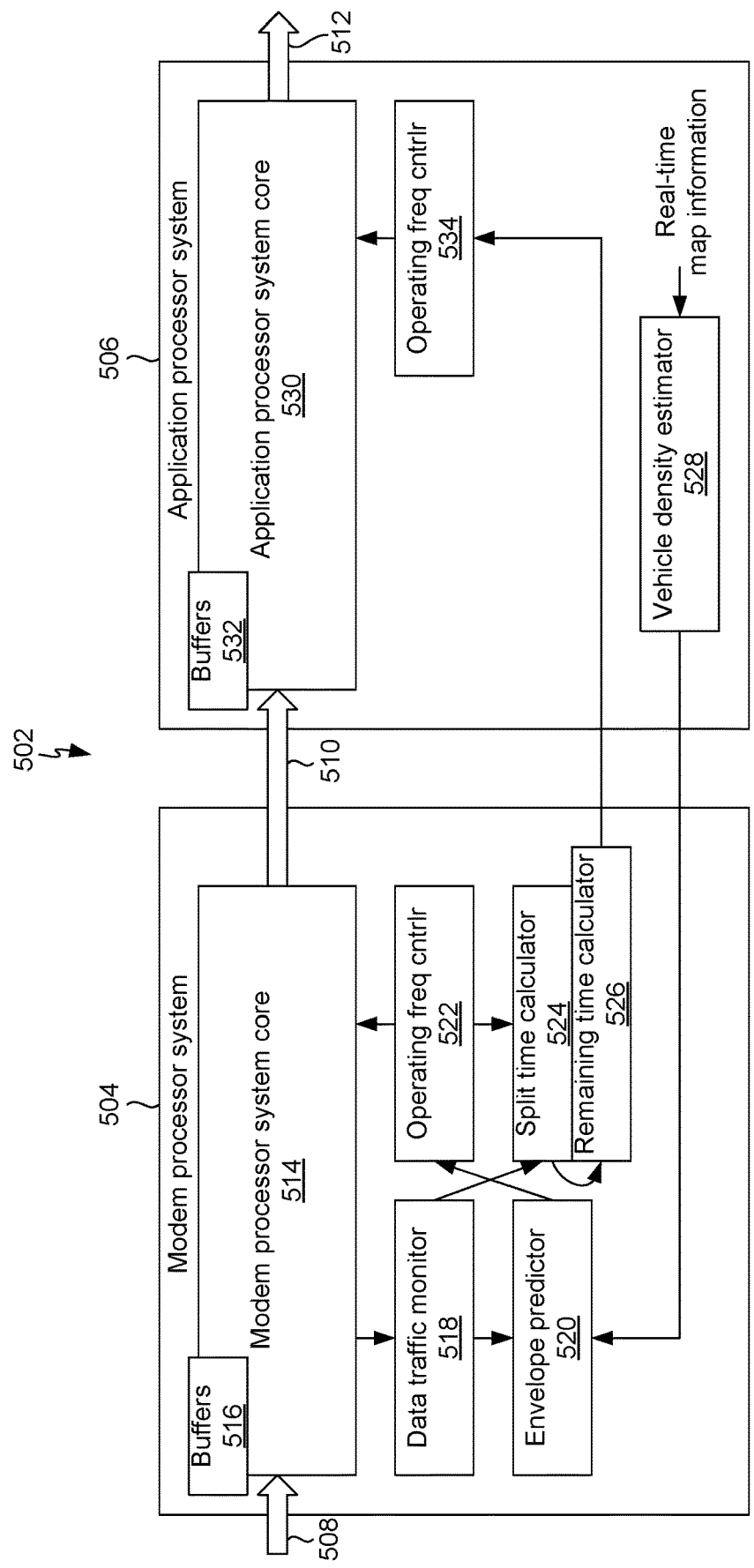
FIG. 5 is block diagram of a yet another system for cooperative DCVS between a first processor system and a second processor system, in accordance with exemplary, embodiments.

As illustrated in FIG. 5, in an illustrative or exemplary embodiment, a system 502 may include a modem processor system 504 and an application processor system 506. The modem processor system 504 is configured to receive input data 508 and process the input data 508 to produce modem processor output data 510. The application processor system 506 is configured to receive the modem processor output data 510 and process the modem processor output data 510 to produce system output data 512. Except as otherwise stated, the elements of the modem processor system 504 and the application processor system 506 may be identical to those of above-described modem processor system 304 and application processor system 306 (FIG. 3) or modem processor system 404 and application processor system 406 (FIG. 4). Accordingly, the modem processor system core 514, data buffers 516, data traffic monitor 518, envelope predictor 520, operating frequency controller 522, split time calculator 524, and remaining time calculator 526 may be identical to the above-described modem processor system core 314 or 414, data buffers 316 or 416, data traffic monitor 318 or 418, envelope predictor 320 or 420, operating frequency controller 322 or 422, split time calculator 324 or 424, and remaining time calculator 326 or 426 (FIGS. 3-4). Similarly, the application processor system core 530, buffers 532, and operating frequency controller 534 may be identical to the above-described application processor system core 330 or 430, buffers 332 or 432, and operating frequency controller 334 or 434 (FIGS. 3-4).

In the exemplary embodiment shown in FIG. 5, the application processor system 506 may include a vehicle density estimator 528. The vehicle density estimator 528 may be configured to determine the density of nearby vehicles, such as vehicles within a predetermined radius or other geographic area, using real-time map information. Such map information may be of the type commonly provided by smartphone applications (and ultimately, by geographic information service providers) for navigation. As such applications and services are well understood by one of ordinary skill in the art, aspects of this feature relating to the source of the real-time map information are not described in this disclosure. The modem processor system 504 may receive an indication representing the determined density of nearby vehicles from the application processor system 506. The envelope predictor 520 may use the received indication representing the determined density of nearby vehicles as an input in determining modem processor workload. That is, in addition to basing its determination of modem processor workload on the amount of incoming data traffic, the envelope predictor 520 may base its determination in part on the density of nearby vehicles. As the density of nearby vehicles is related to the amount of data traffic that the modem processor system 504 is likely to receive, the higher the density of nearby vehicles, the more likely the modem processor system 504 will experience an increase in vehicle-to-vehicle ("V2V") data traffic.

Figure 6:
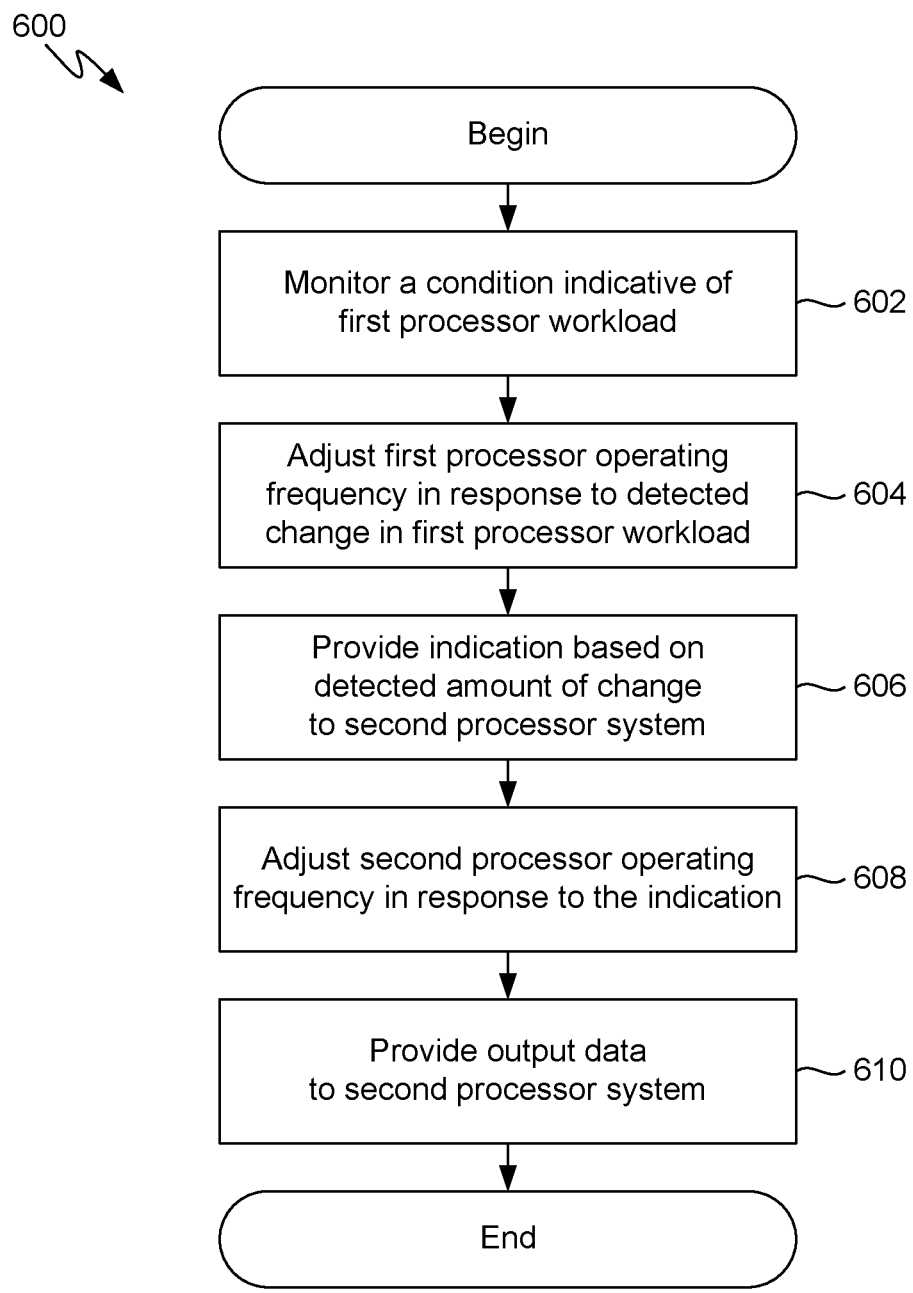
FIG. 6 is a flow diagram illustrating a method for cooperative DCVS between a first processor system and a second processor system, in accordance with exemplary embodiments.

As illustrated in FIG. 6, in an illustrative or exemplary embodiment, a method 600 for cooperative DCVS between a first processor system and a second processor system may include monitoring a condition indicative of the first processor system workload, as indicated by block 602. As indicated by block 604, the method 600 may also include adjusting the first processor operating frequency based on a detected change in the first processor system workload. As indicated by block 606, the method 600 may yet further include the first processor system providing an indication based on the detected change in the first processor system workload to the second processor system. As indicated by block 608, the method 600 may still further include adjusting the second processor operating frequency based on the indication. As indicated by block 610, the method 600 may further include providing output data from the first processor system to the second processor system.

Figure 7:
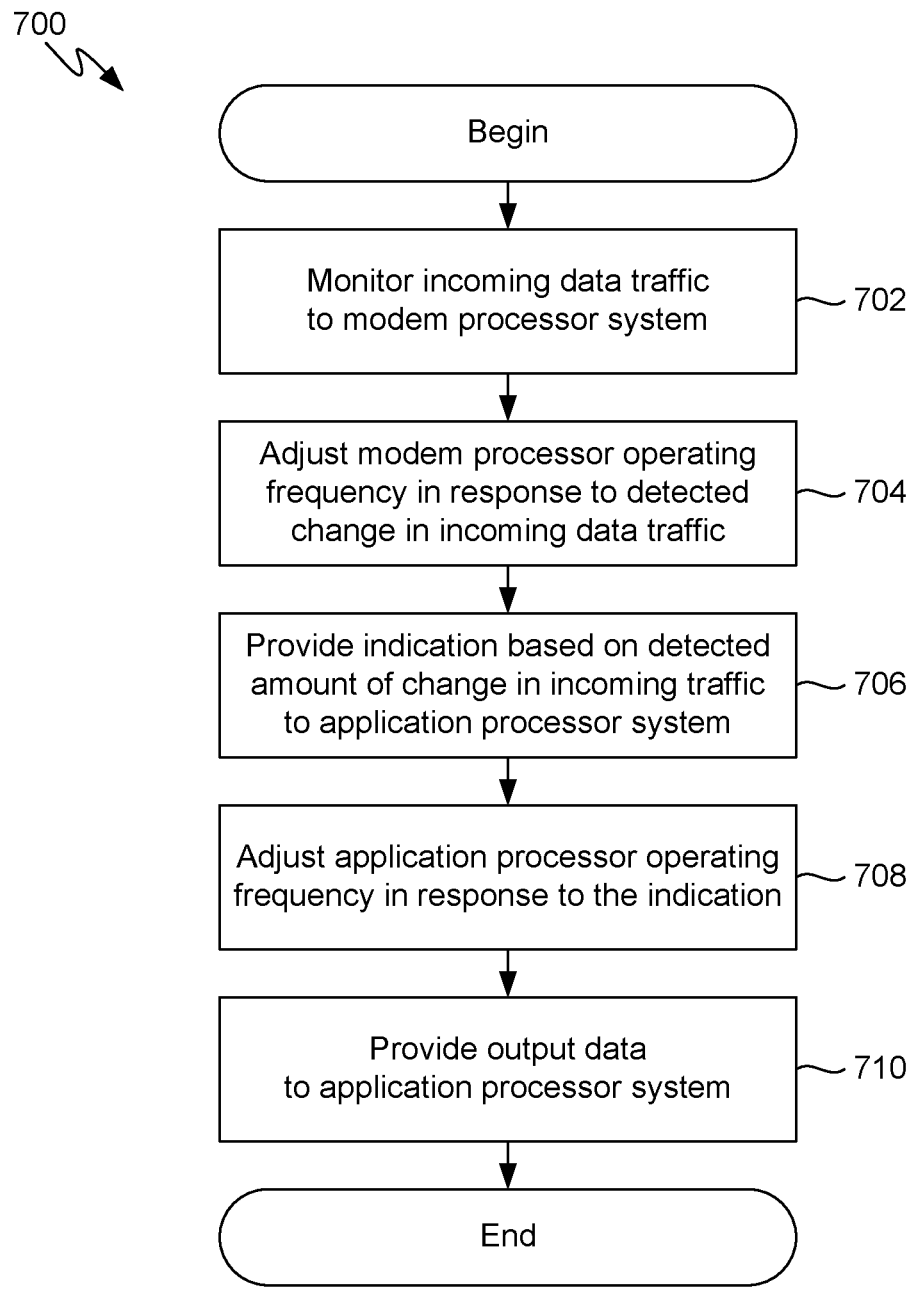
FIG. 7 is a flow diagram illustrating another method for cooperative DCVS between a first processor system and a second processor system, in accordance with exemplary embodiments.

As illustrated in FIG. 7, in an illustrative or exemplary embodiment, a method 700 for cooperative DCVS between a modem processor system and an application processor system may include monitoring the amount of incoming data traffic to the modem processor system, as indicated by block 702. As indicated by block 704, the method 700 may also include adjusting the modem processor operating frequency based on a detected change in the amount of incoming data traffic. As indicated by block 706, the method 700 may yet further include the modem processor system providing an indication to the application processor system based on the detected change in the amount of incoming data traffic. As indicated by block 708, the method 700 may still further include adjusting the application processor operating frequency based on the indication. As indicated by block 710, the method 700 may further include providing output data from the modem processor system to the application processor system.

Figure 8:
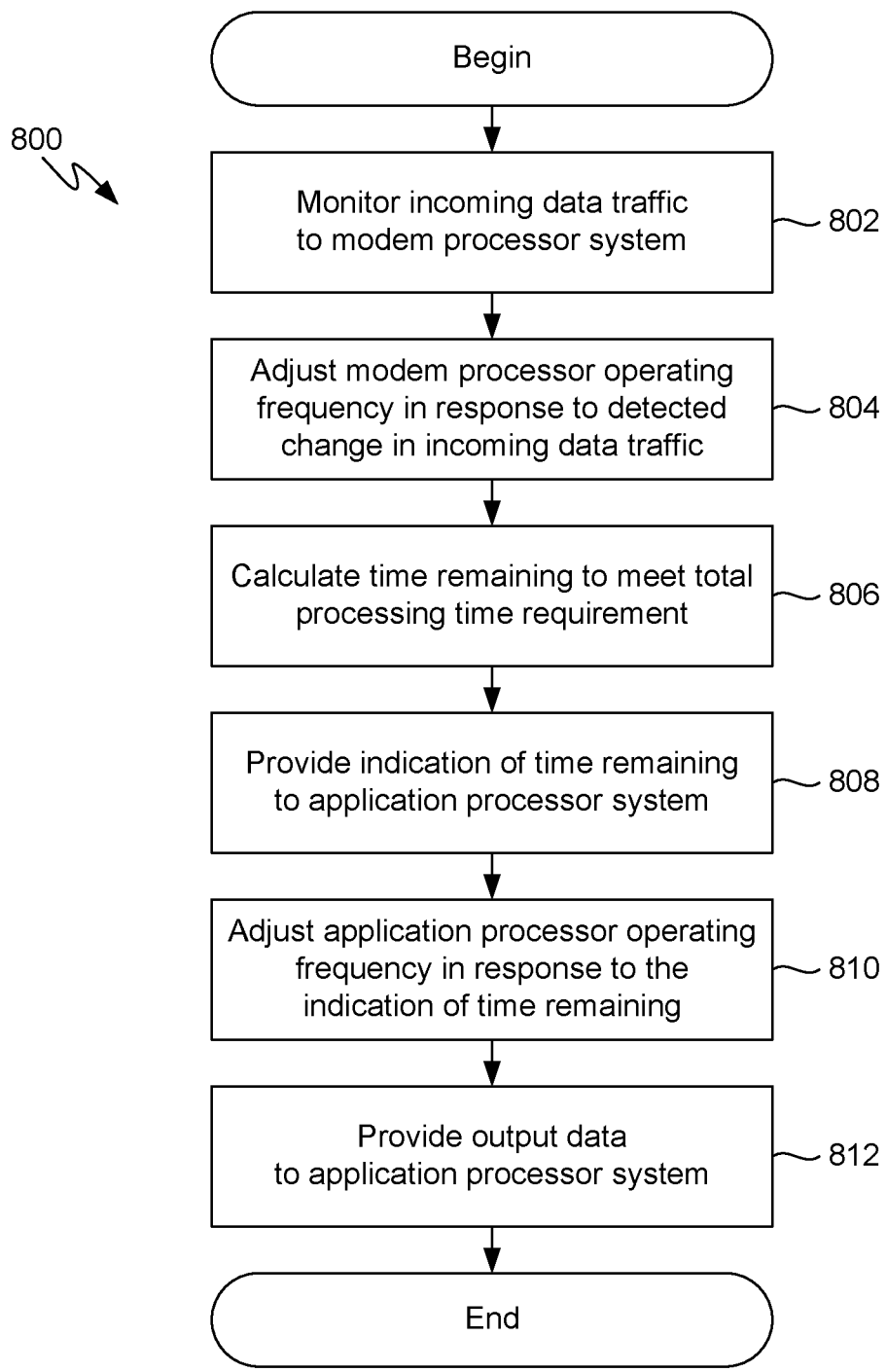
FIG. 8 is a flow diagram illustrating a further method for cooperative DCVS between a first processor system and a second processor system, in accordance with exemplary embodiments.

As illustrated in FIG. 8, in an illustrative or exemplary embodiment, a method 800 for cooperative DCVS between a modem processor system and an application processor system may include monitoring the amount of incoming data traffic to the modem processor system, as indicated by block 802. As indicated by block 804, the method 800 may also include adjusting the modem processor operating frequency based on a detected change in the amount of incoming data traffic. As indicated by block 806, the method 800 may yet further include the modem processor system calculating the amount of time remaining out of a total processing time budget for the application processor system to complete its processing. As indicated by block 808, the method 800 may include providing an indication to the application processor system of the time remaining. As indicated by block 810, the method 800 may still further include adjusting the application processor operating frequency based on the indication of time remaining. As indicated by block 812, the method 800 may further include providing output data from the modem processor system to the application processor system.

Figure 9:
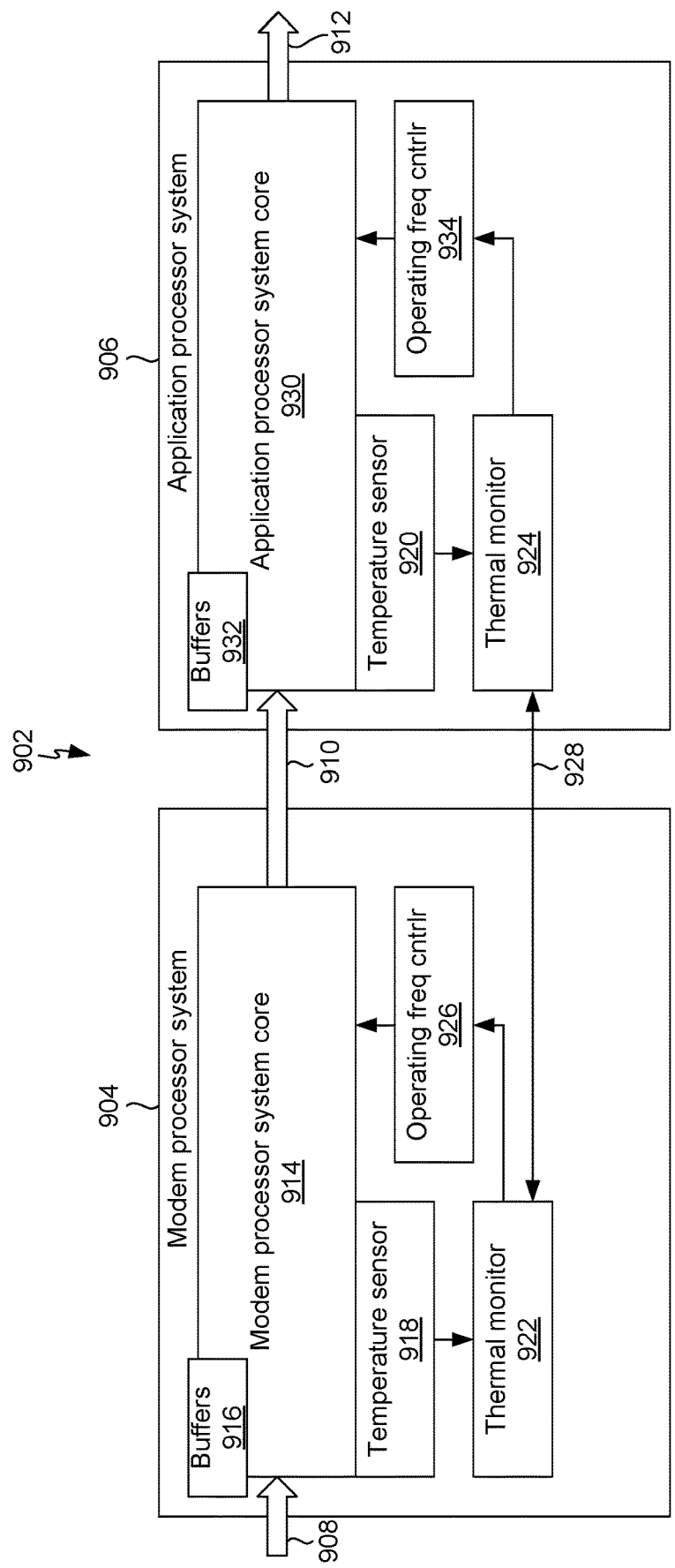
FIG. 9 is block diagram of another system for cooperative DCVS between a first processor system and a second processor system, in accordance with exemplary embodiments.

As illustrated in FIG. 9, in an illustrative or exemplary embodiment, a system 902 may include a modem processor system 904 and an application processor system 906. The modem processor system 904 is configured to receive input data 908 and process the input data 908 to produce modem processor output data 910. The application processor system 906 is configured to receive the modem processor output data 910 and process the modem processor output data 910 to produce system output data 912. Except as otherwise stated, the elements of the modem processor system 904 and the application processor system 906 may be identical to those of above-described modem processor system 304 and application processor system 306 (FIG. 3), modem processor system 404 and application processor system 406 (FIG. 4), or modem processor system 504 and application processor system 506 (FIG. 5). For example, the modem processor system 904 and application processor system 906 may include buffers 916 and 932, respectively, similar to those described above with regard to other exemplary embodiments.

In the exemplary embodiment shown in FIG. 9, the modem processor system 904 and the application processor system 906 may include temperature sensors 918 and 920, respectively. The temperature sensors 918 and 920 are configured to measure temperatures at which the modem processor system core 914 and application processor system core 930, respectively, are operating. A high measured temperature is indicative of a high processor workload. The modem processor system 904 and the application processor system 906 may also include thermal monitors 922 and 924, respectively, which are configured to determine changes in temperature and thus in processor workload. For example, the thermal monitor 922 of the modem processor system 904 may be configured to compare a measured temperature with a threshold and provide an indication if the measured temperature rises above the threshold. An operating frequency controller 926 of the modem processor system 904 may be configured to receive an indication of such a change in processor workload and, in response to the received indication, adjust the operating frequency of the modem processor system core 914. The application processor system 906 may receive the same or a similar indication 928 produced by the thermal monitor 922. Alternatively, in other embodiments (not shown), the application processor system 906 may receive an indication from the modem processor system 904 through metadata associated with the modem processor output data 910, in a manner similar to that described above with regard to FIG. 4.

An operating frequency controller 934 of the application processor system 906 may be configured to adjust the operating frequency of the application processor system core 930 based on a signal or indication provided by the thermal monitor 924. The thermal monitor 924 may be configured to provide that indication based on the indication 928 received from the modem processor system 904 as well as on a temperature measurement received from the temperature sensor 920. For example, the thermal monitor 924 may provide an indication to the operating frequency controller 934 to increase the operating frequency if a temperature measured by the temperature sensor 920 associated with the application processor system core 930 exceeds a threshold, and to decrease the operating frequency if the received indication 928 indicates that a temperature measured by the temperature sensor 918 associated with the modem processor core 914 exceeds a threshold. The modem processor system 904 may receive the same or a similar indication 928 produced by the thermal monitor 924.

Figure 10:
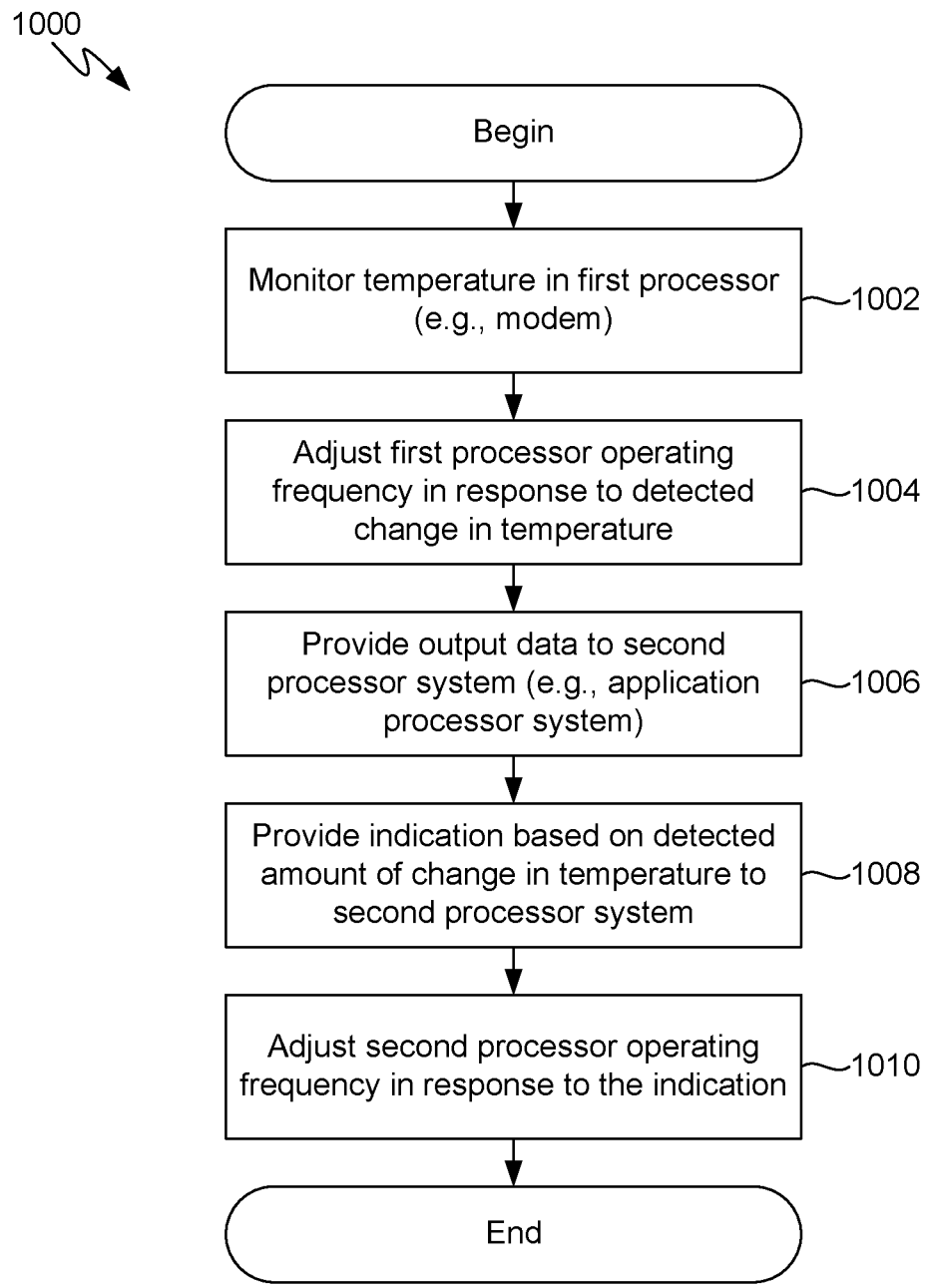
FIG. 10 is a flow diagram illustrating still another method for cooperative DCVS between a first processor system and a second processor system, in accordance with exemplary embodiments.

As illustrated in FIG. 10, in an illustrative or exemplary embodiment, a method 1000 for cooperative RCVS between a first processor system and a second processor system may include monitoring a measured temperature in the first processor system, as indicated by block 1002. As indicated by block 1004, the method 1000 may also include adjusting the first processor operating frequency based on a detected change in the measured temperature. As indicated by block 1006, the method 1000 may further include providing output data from the first processor system to the second processor system. As indicated by block 1008, the method 1000 may yet further include the first processor system providing an indication to the second processor system based on the detected change in the measured temperature in the first processor system. As indicated by block 1010, the method 1000 may still further include adjusting the second processor operating frequency based on the indication.

In an Example of the method 1000 in which the First Processor System is a modern processor system and the second processor system is an application processor system, based on an indication provided by the modern processor system that a measured temperature in the modem processor system exceeds a threshold, the modem processor system operating frequency may be decreased to attempt to reduce the temperature in the modem processor system, and the application processor system operating frequency may be increased to attempt to compensate for the slower processing in the modem processor system. In an example of the method 1000 in which the first processor system is an application processor system and the second processor system is a modem processor system, based on an indication provided by the application processor system that a measured temperature in the application processor system exceeds a threshold, the application processor system operating frequency may be decreased to attempt to reduce the temperature in the application processor system, and the modem processor system operating frequency may be increased to attempt to compensate for the slower processing in the application processor system.

Figure 11:
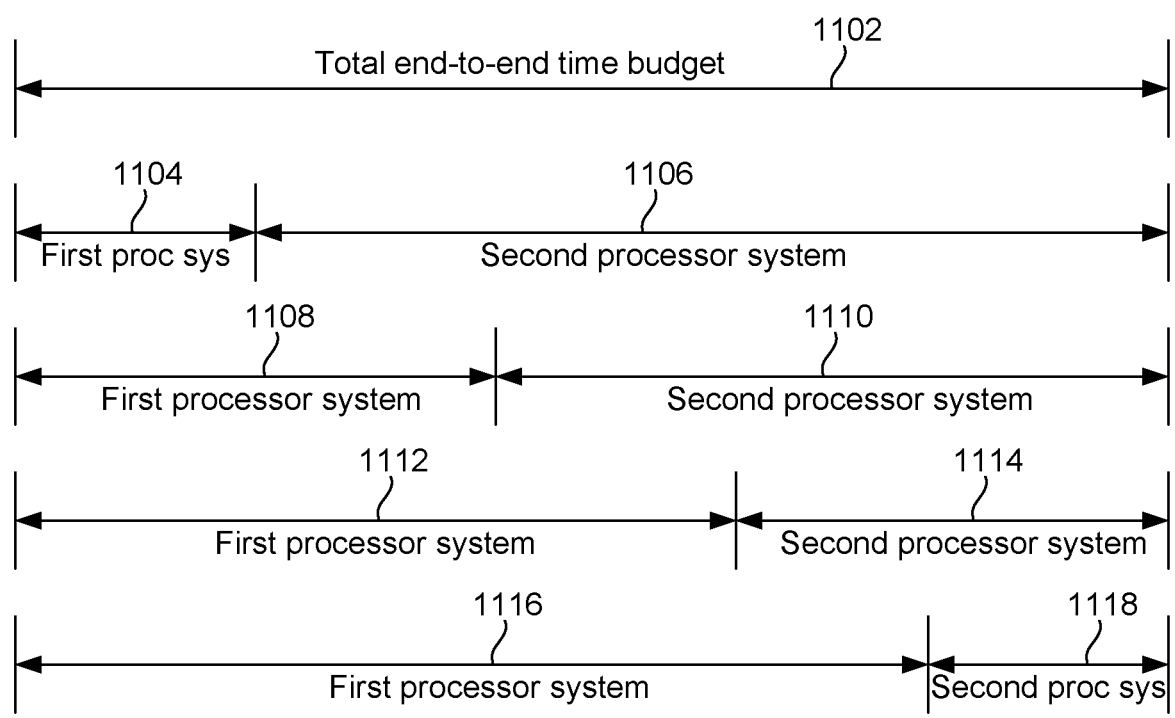
FIG. 11 are time lines illustrating examples of relative processing times of a first processor system and a second processor system.

As illustrated in FIG. 11, in accordance with the above-described systems and methods, a total processing time budget 1102, i.e., a fixed amount of time, may be apportioned between a first processor system and a second processor system by adjusting respective operating frequencies. When the first processor system operating frequency is reduced, the second processor system operating frequency may be increased to compensate for the slower processing in the first processor system (or vice versa), and thereby attempt to complete the total amount of processing by the first and second processor systems within a total processing time budget 1102. For example, as described above with regard to FIG. 8, the first processor system may, in addition to adjusting the first processor operating frequency, calculate the difference between the total processing time budget 1102 and the amount of time elapsed in the first processor system completing its portion of the total processing. The second processor system may adjust the second processor operating frequency in response to that calculated difference, which represents the amount of time remaining for the second processor system to complete its portion of the total processing.

In one example, the foregoing operating frequency adjustments may result in the first processor system completing its processing within an amount of time 1104 and the second processor system completing its processing within an amount of time 1106, where the amounts of time 1104 and 1106 together equal the total processing time budget 1102. In another example, the operating frequency adjustments may result in the first processor system completing its processing within an amount of time 1108, which is somewhat greater than the amount of time 1104, and the second processor system completing its processing within an amount of time 1110, which is somewhat less than the amount of time 1106, where the amounts of time 1108 and 1110 together equal the total processing time budget 1102. In yet another example, the operating frequency adjustments may result in the first processor system completing its processing within an amount of time 1112, which is somewhat greater than the amount of time 1108, and the second processor system completing its processing within an amount of time 1114, which is somewhat less than the amount of time 1110, where the amounts of time 1108 and 1110 together equal the total processing time budget 1102. In still another example, the operating frequency adjustments may result in the first processor system completing its processing within an amount of time 1116, which is somewhat greater than the amount of time 1112, and the second processor system completing its processing within an amount of time 1118, which is somewhat less than the amount of time 1114, where the amounts of time 1116 and 1118 together equal the total processing time budget 1102.

A vehicle is only an example of a device in which systems or methods for cooperative DCVS between a first processor system and a second processor system may be included. More generally, examples of devices that may include such a system or method in accordance with the present disclosure include: a computing system (e.g., server, datacenter, desktop computer), a mobile or portable computing device (e.g., laptop, cell phone, vehicle, etc.), an Internet of Things (Toll) device, a virtual reality (VR) system, an augmented reality (AR) system, etc.

Figure 12:
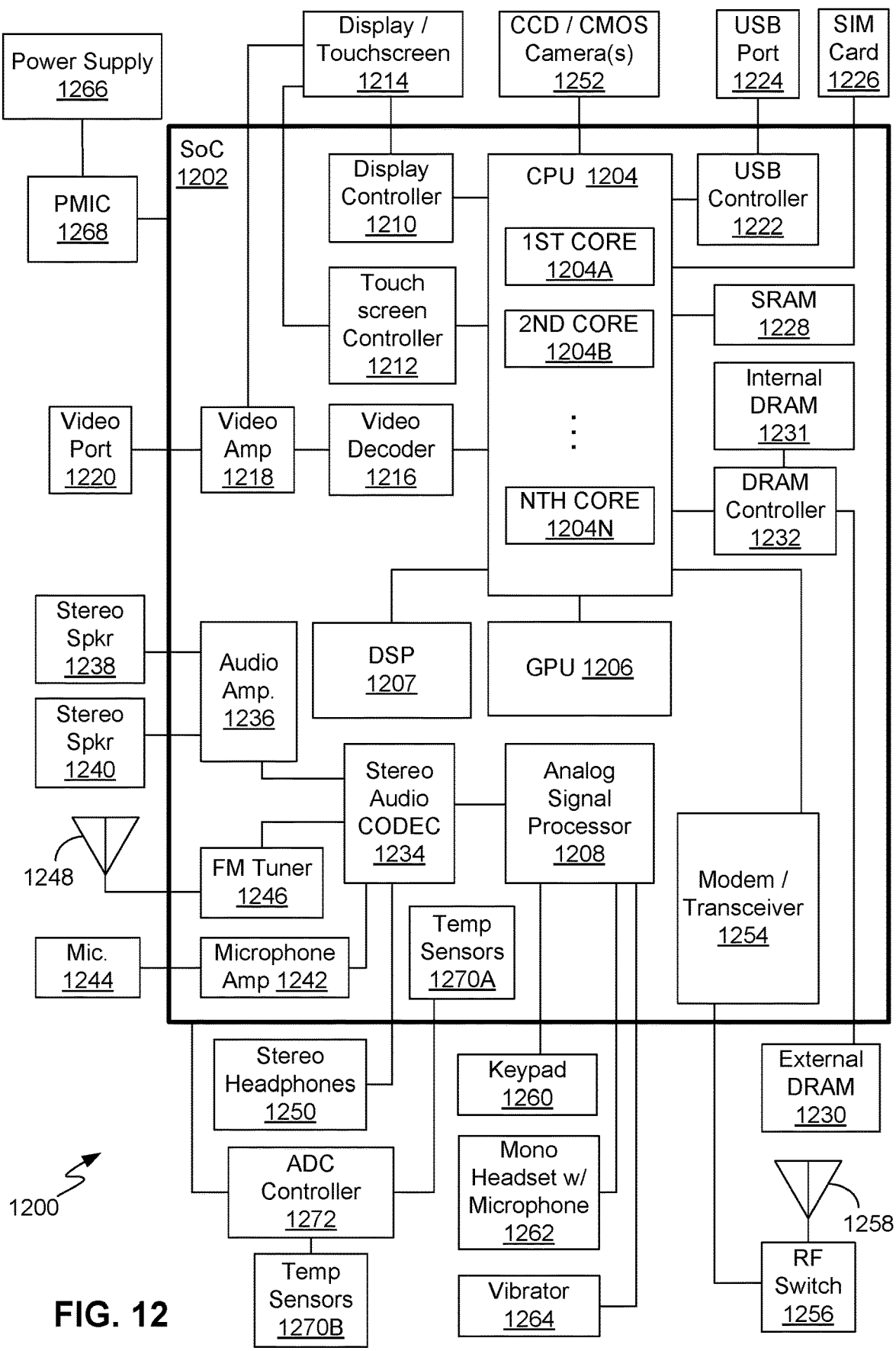
FIG. 12 is a block diagram of a mobile or portable computing device, in accordance with exemplary embodiments.

As illustrated in FIG. 12, exemplary embodiments of systems or methods for DCVS between a first processor system and a second processor system may be embodied in a portable computing device or "PCD" 1200. The PCD 1200 may include an SoC 1202. The SoC 1202 may include a CPU 120.4, a GPU 1206, a DSP 1207, an analog signal processor 1208, or other processors. The CPU 1204 may include multiple cores, such as a first core 1204A, a second core 1204B, etc., through an Nth core 1204N. The CPU 1204 may be an example of an application processor system.

A display controller 1210 and a touchscreen controller 1212 may be coupled to the CPU 1204. A touchscreen display 1214 external to the SoC 1202 may be coupled to the display controller 1210 and the touchscreen controller 1212. The PCD 1200 may further include a video decoder 1216 coupled to the CPU 1204. A video amplifier 1218 may be coupled to the video decoder 1216 and the touchscreen display 1214. A video port 1220 may be coupled to the video amplifier 1218. A universal serial bus ("USB") controller 1222 may also be coupled to CPU 1204, and a USB port 1224 may be coupled to the USB controller 1222. A subscriber identity module ("SIM") card 1226 may also be coupled to the CPU 1204.

One or more memories may be coupled to the CPU 1204. The one or more memories may include both volatile and non-volatile memories. Examples of volatile memories include static random access memory ("SRAM") 1228 and dynamic RAMS ("DRAM"s) 1230 and 1231. Such memories may be external to the SoC 1202, such as the DRAM 1230, or internal to the SoC 1202, such as the DRAM 1231, A DRAM controller 1232 coupled to the CPU 1204 may control the writing of data to, and reading of data from, the DRAMs 1230 and 1231. In other embodiments, such a DRAM controller may be included within a processor, such as the CPU 1204.

A stereo audio CODEC 1234 may be coupled to the analog signal processor 1208. Further, an audio amplifier 1236 may be coupled to the stereo audio CODEC 1234. First and second stereo speakers 1238 and 1240, respectively, may be coupled to the audio amplifier 1236. In addition, a microphone amplifier 1242 may be coupled to the stereo audio CODEC 1234, and a microphone 1244 may be coupled to the microphone amplifier 1242. A frequency modulation ("FM") radio tuner 1246 may be coupled to the stereo audio CODEC 1234. An FM antenna 1248 may be coupled to the FM radio tuner 1246. Further, stereo headphones 1250 may be coupled to the stereo audio CODEC 1234. Other devices that may be coupled to the CPU 1204 include one or more digital (e.g., CCD or CMOS) cameras 1252.

A modem or RF transceiver 1254 may be coupled to the analog signal processor 1208. The modem or RF transceiver 1254 may be an example of a modem processor system.

An RF switch 1256 may be coupled to the RF transceiver 1254 and an RF antenna 1258. In addition, a keypad 1260, a mono headset with a microphone 1262, and a vibrator device 1264 may be coupled to the analog signal processor 1208.

A power supply 1266 may be coupled to the SoC 1202 via a power management integrated circuit ("PMIC") 1268. The power supply 1266 may include a rechargeable battery or a DC power supply that is derived from an AC-to-DC transformer connected to an AC power source.

The SoC 1202 may have one or more internal or on-chip thermal sensors 1270A and may be coupled to one or more external or off-chip thermal sensors 12709. An analog-to-digital converter ("ADC") controller 1272 may convert voltage drops produced by the thermal sensors 1270A and 12709 to digital signals.

The touch screen display 1214, the video port 1220, the USB port 1224, the camera 1252, the first stereo speaker 1238, the second stereo speaker 1240, the microphone 1244, the FM antenna 1248, the stereo headphones 1250, the RF switch 1256, the RF antenna 1258, the keypad 1260, the mono headset 1262, the vibrator 1264, the thermal sensors 12509, the ADC controller 1252, the PMIC 1268, the power supply 1266, the DRAM 1230, and the SIM card 1226 are external to the SoC 1202 in this exemplary embodiment. It will be understood, however, that in other embodiments one or more of these devices may be included in such an SoC.

Firmware or software may be stored in any of the above-described memories, such as DRAM 1230 or 1231, SRAM 1228, etc., or may be stored in a local memory directly accessible by the processor hardware on which the software or firmware executes. Any such memory having firmware or software stored therein in computer-readable form for execution by a processor may be an example of a "computer program product," "computer-readable medium," etc., as such terms are understood in the patent lexicon. Any of the above-described methods 600 (FIG. 6), 700 (FIG. 7), 800 (FIG. 8) and 1000 (FIG. 10) may be performed or controlled, in whole or part, by such a processor executing firmware or software.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for cooperative dynamic clock and voltage scaling ("DCVS") between a first processor system and a second processor system, comprising:
    monitoring, by a workload detection module of the first processor system, a condition indicative of first processor workload;
    adjusting, by a first operating frequency controller of the first processor system, a first processor clock frequency in response to a detected amount of change by the workload detection module in the first processor workload;
    providing, by the first processor system, first processor output data to the second processor system over a first communication link between the first processor system and the second processor system;
    communicating over a second communication link, by the workload detection module of the first processor system, an indication based on the detected amount of change in the first processor workload to a second operating frequency controller of the second processor system contemporaneously with providing the first processor output data; and
    adjusting, by the second operating frequency controller of the second processor system, a second processor clock frequency in response to the indication from the second communication link, such that the first processor system and second processor system work together where clock frequencies are increased in both processor systems by the first and second operating frequency controllers, respectively, to process heavy workloads and clock frequencies are decreased in both processor systems by the first and second operating frequency controllers, respectively, to process light workloads; the heavy workloads and light workloads being detected by the workload detection module.

2. The method of claim 1, wherein monitoring the condition by the workload detection module indicative of first processor workload comprises monitoring a temperature in the first processor system.

3. The method of claim 1, wherein monitoring the condition by the workload detection module indicative of first processor workload comprises monitoring incoming data traffic to the first processor system.

4. The method of claim 3, wherein:
communicating the indication comprises determining by the workload detection module an amount of time elapsed between the incoming data traffic being received by the first processor system and the first processor output data being provided to the second processor system; and
adjusting the second processor clock frequency comprises the second operating frequency controller adjusting the second processor clock frequency in response to the amount of time elapsed.

5. The method of claim 4, wherein communicating the indication by the workload detection module comprises:
determining by the workload detection module a difference between the amount of time elapsed and a fixed amount of time; and
adjusting, by the second operating frequency controller, the second processor clock frequency in response to the difference.

6. The method of claim 3, wherein monitoring the incoming data traffic by the workload detection module comprises monitoring, by the workload detection module of a modem processor system, incoming wireless communication traffic.

7. The method of claim 6, wherein providing the first processor output data to the second processor system comprises providing a processed subframe, and wherein the incoming data traffic comprises a subframe of message traffic.

8. The method of claim 6, wherein the first processor system and the second processor system are included in a vehicle.

9. A system for cooperative dynamic clock and voltage scaling ("DCVS"), comprising:
a first processor system including a workload detection module configured to monitor a condition indicative of a first processor workload and a first operating frequency controller to adjust a first processor clock frequency in response to a detected amount of change in the first processor workload, the first processor clock frequency being adjusted by the first operating frequency controller;
a second processor system configured to receive first processor output data from the first processor system over a first communication link between the first processor system and the second processor system, the workload detection module of the first processor system further configured to provide to a second operating frequency controller of the second processor system an indication over a second communication link based on the detected amount of change in the first processor workload contemporaneously with providing the first processor output data to the second processor system, the second processor system still further configured to adjust a second processor clock frequency with the second operating frequency controller in response to the indication from the workload detection module, such that the first processor system and second processor system work together where clock frequencies are increased in both processor systems by the first and second operating frequency controllers, respectively, to process heavy workloads and clock frequencies are decreased in both processor systems by the first and second operating frequency controllers, respectively, to process light workloads; the heavy workloads and light workloads being detected by the workload detection module.

10. The system of claim 9, wherein the workload detection module of the first processor system includes a temperature sensor, and the condition indicative of first processor workload is a temperature in the first processor system measured by the temperature sensor.

11. The system of claim 9, wherein the workload detection module of the first processor system includes an incoming data traffic monitor, and the condition indicative of first processor workload comprises a measurement of incoming data traffic to the first processor system measured by the incoming data traffic monitor.

12. The system of claim 11, wherein:
the indication comprises the workload detection module determining an amount of time elapsed between incoming data traffic being received by the first processor system and the first processor output data being provided to the second processor system; and
the second processor system is configured to have the second operating frequency controller adjust the second processor clock frequency in response to the amount of time elapsed determined by the workload detection module.

13. The system of claim 12, wherein the workload detection module of the first processor system is configured to provide the indication by being configured to:
determine a difference between the amount of time elapsed and a fixed amount of time; and
the second operating frequency controller adjusting the second processor clock frequency in response to the difference determined by the workload detection module.

14. The system of claim 11, wherein the first processor system comprises a modem processor system, and the incoming data traffic comprises incoming wireless communication traffic.

15. The system of claim 14, wherein the first processor output data comprises a processed subframe, and wherein the incoming data traffic comprises a subframe of message traffic.

16. The system of claim 14, wherein the first processor system and the second processor system are included in a vehicle.

17. A system for cooperative dynamic clock and voltage scaling ("DCVS") between a first processor system and a second processor system, comprising:
means for monitoring a condition indicative of first processor system workload, the means for monitoring comprising a workload detection module;
means for adjusting a first processor clock frequency in response to a detected amount of change in the first processor system workload, the means for adjusting the first processor clock frequency comprising a first operating frequency controller;
means for providing first processor system output data to the second processor system over a first communication link between the first processor system and the second processor system;
means for providing an indication over a second communication link based on the detected amount of change in the first processor system workload by the workload detection module to a second operating frequency controller of the second processor system contemporaneously with providing the first processor system output data; and means for adjusting a second processor clock frequency in response to the indication received from the second communication link, the means for adjusting the second processor clock frequency comprising the second operating frequency controller, such that the first processor system and second processor system work together where clock frequencies are increased in both processor systems by the first and second operating frequency controllers, respectively, to process heavy workloads and clock frequencies are decreased in both processor systems by the first and second operating frequency controllers, respectively, to process light workloads; the heavy workloads and light workloads being detected by the workload detection module.

18. The system of claim 17, wherein the means for monitoring the condition indicative of first processor system workload comprises the workload detection module monitoring a temperature in the first processor system.

19. The system of claim 17, wherein the means for monitoring the condition indicative of first processor system workload comprises the workload detection module monitoring incoming data traffic to the first processor system.

20. The system of claim 19, wherein:
the means for providing the indication over the second communication link comprises the workload detection module determining an amount of time elapsed between the incoming data traffic being received by the first processor system and the first processor output data being provided to the second processor system; and the means for adjusting the second processor clock frequency comprises means for adjusting the second processor clock frequency in response to the amount of time elapsed by the workload detection module.

21. The system of claim 20, wherein the means for providing an indication over the second communication link comprises:
the workload detection module determining a difference between the amount of time elapsed and a fixed amount of time; and
means for adjusting the second processor clock frequency in response to the difference by the workload detection module.

22. The system of claim 19, wherein the means for monitoring the incoming data traffic comprises means for monitoring incoming wireless communication traffic.

23. The system of claim 22, wherein the first processor system and the second processor system are included in a vehicle.

24. The system of claim 23, wherein the means for providing the indication over a second communication link based on the detected amount of change in the first processor system workload by the workload detection module comprises the workload detection module providing the indication based on both the detected amount of change in the first processor system workload and an estimate of density of vehicles within a geographic area.

25. A system for cooperative dynamic clock and voltage scaling ("DCVS"), comprising:
a first chip comprising a modem processor system core, a data traffic monitor, and a modem processor system operating frequency controller, the modem processor system core configured to receive and process incoming wireless communication traffic, the data traffic monitor configured to monitor the incoming wireless communication traffic and to detect an amount of change in the incoming wireless communication traffic which corresponds to a workload of the modem processor, the modem processor system operating frequency controller configured to adjust the modem processor system core clock frequency in response to the detected amount of change by the data traffic monitor in the incoming wireless communication traffic; and a second chip comprising a central processing unit ("CPU") system core and an application processor system operating frequency controller, the application processor system core configured to receive modem processor output data from the modem processor system core over a first inter-chip link between the first chip and the second chip, the first chip further comprising control logic configured to provide over a second inter-chip link to the application processor system operating frequency controller of the second processor system an indication based on the detected amount of change in the incoming wireless communication traffic by the data traffic monitor, the application processor system operating frequency controller configured to adjust an application processor system core clock frequency in response to the indication received from the second inter-chip link, such that the first chip and second chip work together where clock frequencies are increased in both chips by respective operating frequency controllers to process heavy workloads and clock frequencies are decreased in both chips by respective operating frequency controllers to process light workloads, the heavy workloads and light workloads being detected by the data traffic monitor.

26. The system of claim 25, wherein the first chip comprises a time calculator configured to determine the indication by determining an amount of time elapsed between incoming data traffic being received by the modem processor system and the modem processor output data being provided to the application processor system core.

27. The system of claim 26, wherein the control logic is configured to determine the indication by determining a difference between the amount of time elapsed and a fixed amount of time.

28. The system of claim 25, wherein the modem processor output data comprises a processed subframe of wireless communication traffic.

29. The system of claim 25, wherein the first processor system and the second processor system are included in a vehicle.

30. The system of claim 25, wherein the control logic is further configured to provide the indication based on an estimate of density of vehicles within a geographic area.

* * * * *